(12) United States Patent
Ngoc et al.

(10) Patent No.: US 6,337,374 B1
(45) Date of Patent: Jan. 8, 2002

(54) POLYMER BLEND HAVING LOW COMPRESSION SET

(75) Inventors: Hung Dang Ngoc, Limeil Brevannes; Agnés Marie Madeleine Louise DeLoor, Guyancourt, both of (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/452,229

(22) Filed: Dec. 1, 1999

(51) Int. Cl.$^7$ .................. C08L 35/02; C08F 265/00; C08F 8/00
(52) U.S. Cl. .................. 525/226; 525/193; 525/227; 525/228; 525/305
(58) Field of Search .................. 525/193, 194, 525/226, 227, 228, 242, 305, 332.6

(56) References Cited

U.S. PATENT DOCUMENTS

| | | | | | |
|---|---|---|---|---|---|
| 4,309,332 A | * | 1/1982 | Fischer | ...... | 525/194 |
| 5,051,478 A | * | 9/1991 | Puydak | ...... | 525/194 |
| 5,274,035 A | * | 12/1993 | Chundury | ...... | 525/194 |
| 5,380,785 A | * | 1/1995 | Ngoc | ...... | 525/304 |
| 5,415,940 A | * | 5/1995 | Ngoc | ...... | 428/424.4 |
| 5,504,155 A | * | 4/1996 | Ngoc | | |
| 5,504,160 A | * | 4/1996 | Ngoc | ...... | 525/274 |
| 5,616,651 A | * | 4/1997 | Nino | ...... | 525/305 |
| 6,090,889 A | * | 7/2000 | DeLoor | ...... | 525/233 |

* cited by examiner

Primary Examiner—Christopher Henderson
(74) Attorney, Agent, or Firm—Alvin T. Rockhill

(57) ABSTRACT

There is a need for halogen-free polymeric compositions for utilization in gaskets and seals that offers high tensile strength and high tear strength as well as good resistance to compression set. Seals for automotive body applications, such as, windows, hoods, trunks, and doors, and building applications, such as window glazing gaskets and weather strips, should be dimensionally stable, provide low compression set, and offer outstanding sealing characteristics over a broad temperature range. They must be capable of sealing out noise, wind and water, while providing long-term ultraviolet light resistance. This invention discloses a polymeric composition comprising (1) a compatibilizing polymer selected from the group consisting of ethylene vinyl acetate and ethylene alkyl acrylate co(polymer), (2) a polyolefin, (3) a curative system, such as a free radical generator, (4) a rubbery polyolefin, such as an ethylene-propylene-diene monomer polymer and (5) a rubbery polymer which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent. The polymeric compositions of this invention can also optionally contain a plasticizer.

18 Claims, No Drawings

POLYMER BLEND HAVING LOW COMPRESSION SET

BACKGROUND OF THE INVENTION

Seals for automotive body applications (such as, windows, hoods, trunks and doors) and building applications (such as window glazing gaskets and weather strips) should be dimensional stable, provide low compression set, and offer outstanding sealing characteristics over a broad temperature range. Such seals must be capable of sealing out noise, wind and water, while providing long-term ultraviolet light resistance. At the same time the material used in the seal must offer the degree of flexibility required for the particular application. Window and door weather stripping for automobiles and trucks is a high volume application for such seals. However, seals offering essentially the same characteristics are also needed for sun roof seals, handle gaskets, window spacers, window guides, lock seals, windshield wiper pivot seals and in building applications such as window glazing gaskets and weather seals.

Rubbery blends of polyvinyl chloride (PVC) with a nitrile rubber (NBR) have sometimes been used in seals for automotive body applications. The nitrile rubber is included in such blends as a permanent modifier for the PVC that provides it with a higher degree of flexibility. However, the utilization of standard nitrile rubber in such blends typically results in only moderate compression set characteristics. It is very important for seals to have good compression set characteristics in most applications. For instance, improved resistance to water leaks and wind noise can be attained by utilizing a seal which has low compression set characteristics.

It is known from the teachings of UK Patent Application No. 9214969.9 that low compression set characteristics can be improved by utilizing a technique known as "dynamic vulcanization" via free radical generators, such as azo compounds or organic peroxides. However, this "dynamic vulcanization" technique suffers from the weakness that the azo compounds or organic peroxides required reduce the thermal stability of the polyvinylchloride resin and the ultraviolet light resistance of the nitrile rubber. There is also an increased risk of early crosslinking during processing which leads to scorching and reduced recyclability.

U.S. Pat. No. 5,552,468 discloses a highly crosslinked nitrile rubber composition which can be blended with polyvinyl chloride to make compositions having excellent characteristics for seals and gaskets including dimensional stability, low compression set, and outstanding sealing characteristics, said highly crosslinked nitrile rubber composition being comprised of (1) a highly crosslinked nitrile rubber having repeat units which are derived from (a) 1,3-butadiene, (b) acrylonitrile, and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr of a plasticizer.

Today there is a growing demand for seals and gaskets that do not contain halogens, such as polyvinyl chloride. This is because industry in general and the automotive industry in particular are attempting to reduce the amount of halogenated materials in industrial products for improved recyclability and other environmental reasons.

U.S. patent application Ser. No. 09/769,636, filed on Jan. 25, 20001, pending discloses a polymeric composition comprising (1) a compatibilizing polymer selected from the group consisting of ethylene vinyl acetate and ethylene alkyl acrylates, (2) a polyolefin, (3) a free radical generator, and (4) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent. However, these polymeric compositions do not have enough resistance to compression set to be useful in most applications as seals and gaskets.

SUMMARY OF THE INVENTION

This invention relates to halogen-free polymeric compositions that can be employed in seals and gaskets for automotive and building application. These polymeric compositions have good tensile strength, tear resistance, ultra violet light resistance, and resistance to compression set. More specifically, this invention discloses a polymeric composition that has excellent characteristics for use in manufacturing seals and gaskets, said polymeric composition comprising (1) a compatibilizing polymer selected from the group consisting of ethylene vinyl acetate and ethylene alkyl acrylate co(polymer), (2) a polyolefin, (3) a curative system, (4) a rubbery polyolefin, and (5) a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent. The polymeric compositions of this invention can also optionally contain a plasticizer. The rubbery polyolefin can be an ethylene-propylene-diene monomer polymer (EPDM), and the curative system will typically be a free radical generator.

DETAILED DESCRIPTION OF THE INVENTION

The rubbery polymers that can be utilized in making the blends of this invention are synthesized utilizing a free radical emulsion polymerization technique. These rubbery polymers are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, the rubbery polymers of this invention contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units which are derived from those monomers.

The rubbery polymers of this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene and (e) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

The rubbery polymer will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene and (e) from about 1 weight percent to about 3 weight percent of a crosslinking agent. The percentages reported in this paragraph are based upon the total weight of the rubbery polymer.

U.S. Pat. No. 5,616,651 describes a process for synthesizing rubbery polymers that can be employed in the blends of this invention in detail. The teachings of U.S. Pat. No. 5,616,651 are accordingly incorporated herein by reference in their entirety. Rubbery polymers that can be used in the practice of this invention are also sold by The Goodyear Tire & Rubber Company as Sunigum® rubber.

Some representative examples of ethylene alkylacrylate polymers that can be used as compatibilizing polymers in the blends of this invention include ethylene/methyl acrylate copolymers, ethylene/ethyl acrylate copolymers, ethylene/propyl acrylate copolymers, ethylene/butyl acrylate copolymers, ethylene/butyl acrylate/carbon monoxide terpolymers, ethylene/ethyl acrylate/maleic anhydride terpolymers and ethylene/acrylate/glycidyl methacrylate terpolymers. The ethylene-vinyl acetate (EVA) copolymers that can be used as compatibilizing polymers in the practice of this invention will typically contain from about 7 weight percent to 40 weight percent of the vinyl acetate monomer. Such ethylene-vinyl acetate copolymers are commercially available from a wide variety of sources. For instance, Du Pont sells ethylene-vinyl acetate copolymers under the trade name Elvax® and Elf-Atochem sells ethylene-vinyl acetate copolymers under the trade name Evatane®.

A wide variety of polyolefins can be utilized in the blends of this invention. Some representative examples of polyolefins that can be used include polyethylene, polyethylene synthesized with metallocene catalyst systems, polypropylene, polyethylene/polypropylene copolymers and other thermoplastic polyolefins. It is preferable for the polyolefin to be semi-crystalline.

Conventional rubbery polyolefins can be utilized in the blends of this invention. Some representative examples of rubbery polyolefins that can be used include ethylene-propylene rubber (EPM), ethylene-propylene-diene monomer rubber (EPDM), polyethylene synthesized with metallocene catalyst systems, butyl rubber, styrene-ethylene butylene-styrene rubber (SEBS), and ethylene-acrylic rubber. Such rubbery polyolefins are commercially available from a wide variety of sources.

Different curative systems, such as sulfur, free radical generators, phenolic resins, quinone derivatives, maleimides, and mixtures of these systems, can be used in the blends of this invention. However, phenolic resins are generally preferred.

The free radical generator can be virtually any chemical compound that will produce free radicals when heated to a temperature of at least about 90° C. The free radical generator will preferably produce free radicals after being heated to a temperature of at least about 100° C. The free radical generators that can be utilized include 2,2'-azo-bis(2-acetoxypropane), 2,5-dimethyl-2,5-bis(tert-butyl-peroxy)-hexyne, 2,5-dimethyl-2,5-bis(tert-butyl-peroxy)-hexane, dibutyl peroxide, tert-butylcumyl peroxide, bis(2-tert-butylperoxypropyl-(2))-benzene, dicumyl peroxide, bis(tert-butyl)-3,3 ethylene butyrate, bis(tert-butyl) 4,4-butyl valerate, tert-butyl peroxy-3,5,5 trimethylhexanoate, tert-butyl perbenzoate, and bis(tert-butyl peroxy) 1,1-trimethyl-3,3,5-cyclohexane, and the like. It is normally preferred to use a phenolic resin as the free radical generator because improved resistance to compression set results.

In cases where a free radical generator is used as the curative system it is preferred for a cocuring agent, such as 1,1'-(methylene-4,1-phenylene) bis-maleimide, m-phenylene-diamine-bis maleimide, triallyl cyanurate, triallyl isocyanurate, diallyl terephthalate, diallyl fumarate, triallyl mellitate, triallyl citrate, triallyl phosphate, trimethylol propane trimethacrylate, diallyl phthalate, ethyleneglycol-dimethacrylate, zinc di(meth)acrylate, magnesium di(meth)acrylate, m-phenylene-diamine-bis-maleic-imid, sulfur, or the like, to be included in the blend to reduce the mixing time required to crosslink the rubbery polymer. For a list of suitable cocuring agents, see T H Kempermann, Rubber Chem & Tech, July/August 1988, Volume 61, No 3.

A wide variety of plasticizers which are compatible with the polyolefin resin and/or the rubbery polymer can also optionally be employed. The plasticizers employed will normally be in the liquid state and can be polar or non-polar in nature. The term "polar plasticizer" as used herein means a plasticizer that is compatible with a polar polymer, such as polyvinylchloride (PVC). Some representative examples of polar plasticizers include phosphate derivative plasticizers, phthalate derivative plasticizers, adipate derivative plasticizers, azelate derivative plasticizers, tallate derivative plasticizers, sebacate derivative plasticizers, and trimellitate derivative plasticizers. The term "non-polar" as used herein means a plasticizer that is compatible with a non-polar polymer, such as polyolefins and the like. Some representative examples of non-polar plasticizers include conventional hydrocarbon oil diluents or process oils, such as paraffin oil, naphthalene oil, and the like.

The polymeric compositions described herein can be made by initially blending the compatibilizing polymer, the curing system, the rubbery polymer and the rubbery polyolefins in a first step. This step can be conducted at a temperature that is either below or above the temperature at which the free radical generator produces free radicals. For instance, it can be carried out at a temperature below the decomposition temperature of the peroxide that was used as the free radical generator. The desired polyolefin, the rubbery polyolefin, and optionally the plasticizer can subsequently be blended into the blend of the compatibilizing polymer, the curative system and the rubbery polymer in a second mixing step. This step must be conducted at a temperature above the temperature at which the dynamic vulcanization is carried out in the event that the first step is conducted at a lower temperature. The five or six components of the blend can, of course, also be mixed together in a single mixing step that is carried out above the temperature at which the free radical generator produces free radicals (above the temperature at which dynamic vulcanization takes place).

The blends of this invention will typically contain from about 1 part to about 500 parts of the polyolefin polymer, from about 1 parts to about 500 parts of the rubbery polyolefin, optionally, from about 1 part to about 400 parts of the plasticizer, from about 1 part to about 200 parts by weight of the compatibilizing polymer, about 0.05 parts to about 10 parts of the curative system, and optionally, about 0.01 parts to about 10 parts of the cocuring agent per 100 parts by weight of the rubbery polymer. It is typically preferred for the polymeric compositions of this invention to contain from about 5 parts to about 300 parts of the polyolefin polymer, from about 5 parts to about 300 parts of the rubbery polyolefin, optionally, from about 5 parts to about 300 parts of the plasticizer, from about 5 to about 100 parts by weight of the compatibilizing polymer, about 0.05 parts to about 6 parts of the curative system, and optionally, about 0.05 parts to about 6 parts of the cocuring agent per 100 parts by weight of the rubbery polymer. It is typically most preferred for the polymeric compositions of this invention to contain from about 10 parts to about 200 parts of the polyolefin polymer, from about 10 parts to about 200 parts of the rubbery polyolefin, optionally, from about 10 parts to about 200 parts of the plasticizer, from about 10 to about 50 parts by weight of the compatibilizing polymer, about 0.1 parts to about 4 parts of the curative system, and optionally, about 0.1 parts to about 4 parts of the cocuring agent per 100 parts by weight of the rubbery polymer.

Other ingredients, such as antioxidants and fillers, can be added to the polymeric composition to attain the desired properties and to reduce cost. Various colorants and/or pigments will typically also be added to the composition to attain the desired color.

This invention is illustrated by the following examples that are merely for the purpose of illustration and are not to be regarded as limiting the scope of the invention or the manner in which it can be practiced. Unless specifically indicated otherwise, all parts and percentages are given by weight.

EXAMPLE 1

In this experiment 49 parts of Sunigum® 7395 was blended with 14 parts of Dural 4049 EPDM rubber, 7 parts of AX8900 ethylene/acrylate/glycidyl methacrylate, and 30 parts of a Appryl 3020GN3 ethylene-propylene copolymer in a Haake Rheocord at 180° C. at 50 rpm for 5 minutes. Then 2.3 grams of 7500E phenolic resin and 0.3 grams of SnCl2 were added into 50 grams of the mixture and it was blended for an additional 5 minutes. The blend was then molded at 180° C. for 10 minutes. Some of the physical properties of the blend made were determined and are reported in Table I.

TABLE I

| | |
|---|---|
| Tensile Strength | 12.4 MPa |
| Elongation at Break | 216% |
| 50% Modulus | 6.2 MPa |
| 100% Modulus | 8.5 MPa |
| Tear Strength | 44.95 KN/m |

EXAMPLES 2–5

COMPARATIVE EXAMPLE 6

In this experiment, a blend of 45 parts of Sunigum® 7395 rubber, 25 parts of Appryl® 3020 polyethylene/polypropylene copolymer, 25 parts of Dutral 4049 EPDM, 5 parts of Lotader® AX8900 random ethylene/acrylic ester/glycidol methacrylate terpolymer (compatibilizing polymer), and the amount (in parts) of the curative system shown in Table II were blended together. The samples were blended at 180° C. in a Haake Rheocord for 10 minutes and were subsequently compression molded at 180° C. for 10 minutes. Some of the physical properties of the blends were determined and are reported in Table II.

TABLE II

| Example | 2 | 3 | 4 | 5 | 6 |
|---|---|---|---|---|---|
| dicumyl peroxide | 0.1 | 0.2 | 0.5 | 0 | 0 |
| bis-maleimide | 0.2 | 0.4 | 1 | 0 | 0 |
| phenolic resin | 0 | 0 | 0 | 4.2 | 0 |
| tin dichloride | 0 | 0 | 0 | 0.55 | 0 |
| Shore A hardness | 81 | 81 | 83 | 86 | 80 |
| Shore D hardness | 24.2 | 25.1 | 27.4 | 29.4 | 19.5 |
| Stress (MPa) @ 50% strain | 4.4 | 4.8 | 5.1 | 5.6 | 3.9 |
| Stress (MPa) @ 100% strain | 5.6 | 6.0 | 6.3 | 7.4 | 4.6 |
| Stress (MPa) @ 200% strain | 7.1 | 7.6 | 7.9 | | |
| Tensile Strength MPa | 7.9 | 8.8 | 8.5 | 8.9 | 5.2 |
| Strain @ break, % | 290 | 304 | 264 | 154 | 197 |
| Tear Strength, kN/m % | 41 | 44 | 47 | 51 | 30 |
| Compression Set, 22 hours at 70° C. % | 63 | 63 | 59 | 50 | 72 |

As can be seen from Table II, the blends of this invention had better compression set than did the control (Comparative Example 6) which was made without utilizing a curative system. The blend made with the phenolic resin (Example 5) had more resistance to compression set than did any of the other blends. Thus, this experiment shows that the use of a phenolic resin in the blends of this invention results in superior resistance to compression set.

EXAMPLES 7–10

COMPARATIVE EXAMPLE 11

In this experiment, a blend of 45 parts of Sunigum® 7395 rubber, 25 parts of Appryl® 3020 polyethylene/polypropylene copolymer, 25 parts of Dutral 4049 EPDM, 5 parts of Elvax 360 ethylene vinyl acetate (compatibilizing polymer), and the amount (in parts) of the curative system shown in Table III were blended together. The samples were blended in a Haake Rheocord at 180° C. for 10 minutes and were subsequently compression molded at 180° C. for 10 minutes. Some of the physical properties of the blends were determined and are reported in Table III.

TABLE III

| Example | 7 | 8 | 9 | 10 | 11 |
|---|---|---|---|---|---|
| dicumyl peroxide | 0.1 | 0.2 | 0.5 | 0 | 0 |
| bis-maleimide | 0.2 | 0.4 | 1 | 0 | 0 |
| phenolic resin | 0 | 0 | 0 | 4.2 | 0 |
| tin dichloride | 0 | 0 | 0 | 0.55 | 0 |
| Shore A hardness | 85 | 86 | 83 | 90 | 81 |
| Shore D hardness | 23.5 | 27.5 | 28.8 | 33.2 | 19.7 |
| Stress (MPa) @ 50% strain | 4.4 | 4.6 | 5.1 | 5.7 | 4.9 |
| Stress (MPa) @ 100% strain | 5.3 | 5.5 | 6.0 | 7.2 | 5.3 |
| Stress (MPa) @ 200% strain | 6.2 | 6.6 | 7.1 | | |
| Tensile Strength MPa | 6.5 | 7.0 | 7.3 | 7.6 | 5.4 |
| Strain @ break, % | 293 | 314 | 248 | 152 | 166 |
| Tear Strength, % | 38 | 44 | 47 | 48 | 32 |
| Compression Set, % | 70 | 64 | 60 | 49 | 82 |

As can be seen from Table III, the blends of this invention had better compression set than did the control (Comparative Example 11) which was made without utilizing a curative system. The blend made with the phenolic resin (Example 10) had more resistance to compression set than did any of the other blends. Thus, this experiment again shows that the use of a phenolic resin in the blends of this invention results in superior resistance to compression set.

EXAMPLES 12–14

COMPARATIVE EXAMPLES 15–16

In this experiment, a blend of 45 parts of Sunigum® 7395 rubber, 25 parts of Appryl® 3020 polyethylene/polypropylene copolymer, 25 parts of Dutral 4049 EPDM, 5 parts of Lotader® AX8900 random ethylene/acrylic ester/glycidyl methacrylate terpolymer (compatibilizing polymer), and the amount (in parts) of the curative system shown in Table IV were blended together. In Examples 13–14 diisodecyladipate (DIDA) plasticizer and Nyflex B222 mineral oil plasticizer was also included in the blend. The samples were blended at 180° C. for 10 minutes and were subsequently compression molded at 180° C. for 10 minutes. Some of the physical properties of the blends were determined and are reported in Table IV.

TABLE IV

| Example | 12 | 13 | 14 | 15 | 16 |
|---|---|---|---|---|---|
| phenolic Resin | 4.2 | 4.2 | 4.2 | 4.2 | 4.2 |
| Tin Dichloride | 0.55 | 0.55 | 0.55 | 0.55 | 0.55 |
| DIDA | 0 | 30 | 0 | 30 | 0 |
| Nyflex B222 mineral oil | 0 | 30 | 0 | 30 | 0 |
| Mineral Oil Plasticizer | 0 | 0 | 30 | 0 | 0 |
| Shore A Hardness | 86 | 69 | 70 | 60 | 43 |
| Stress D Hardness | 29.4 | 16.8 | 17.5 | 13.0 | |
| Stress (MPa) @ 50% Strain | 5.6 | 2.8 | 2.4 | | 1.7 |
| Stress (MPa) @ 100% Strain | 7.4 | 4.4 | 3.6 | | |
| Stress (MPa) @ 200% Strain | | | 5.6 | | |
| Tensile Strength, MPa | 8.9 | 5.4 | 5.7 | 0.9 | 1.8 |
| Strain @ break, % | 154 | 150 | 209 | 314 | 84 |
| Tear Strength, kN/M % | 51 | 23 | 25 | 6 | 16 |
| Compression Set, 22 hours at 70° C. % | 80 | 34 | 34 | 88 | 61 |

As can be seen from Table IV, the blends of this invention had better compression set than did the controls (Comparative Examples 15–16). The blends made with the plasticizers (Examples 13 and 14) had more resistance to compression set than did the other blends. Thus, this experiment shows that the inclusion of a plasticizer in the blends of this invention results in further improvements in resistance to compression set.

While certain representative embodiments and details have been shown for the purpose of illustrating the subject invention, it will be apparent to those skilled in this art that various changes and modifications can be made therein without departing from the scope of the subject invention.

What is claimed is:

1. A polymeric composition comprising (1) about 1 to 200 parts by weight of a compatibilizing polymer per 100 parts by weight of the rubbery polymer selected from the group consisting of ethylene vinyl acetate and ethylene alkyl acrylates, (2) about 5 parts to about 500 parts of a polyolefin, (3) a curative system, (4) a rubbery polyolefin, and (5) about 1 part to about 500 parts of a rubbery polymer which is comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent.

2. A composition as specified in claim 1 wherein said compatibilizing polymer is ethylene vinyl acetate.

3. A composition as specified in claim 1 wherein said compatibilizing polymer is an ethylene alkyl acrylate.

4. A composition as specified in claim 3 wherein said ethylene alkyl acrylate is selected from the group consisting of ethylene alkylacrylate polymers that can be used in the blends of this invention include ethylene/methyl acrylate copolymers, ethylene/ethyl acrylate copolymers, ethylene/propyl acrylate copolymers, ethylene/butyl acrylate copolymers, ethylene/butyl acrylate/carbon monoxide terpolymers, ethylene/ethyl acrylate/maleic anhydride terpolymers and ethylene/acrylate/glycidyl methacrylate terpolymers.

5. A composition as specified in claim 1 wherein said polyolefin is polyethylene.

6. A composition as specified in claim 1 wherein said polyolefin is polypropylene.

7. A composition as specified in claim 1 wherein said polyolefin is an ethylene/propylene copolymer.

8. A composition as specified in claim 1 wherein said composition contains from about 10 parts to about 200 parts of the polyolefin polymer, about 10 parts to about 200 parts of the rubbery polyolefin, and from about 10 to about 50 parts by weight of the compatibilizing polymer per 100 parts by weight of the rubbery polymer.

9. A composition as specified in claim 5 wherein said polyethylene was prepared with a metallocene catalyst.

10. A composition as specified in claim 1 wherein rubbery polyolefin is selected from the group consisting of ethylene-propylene rubber, ethylene-propylene-diene monomer rubber, butyl rubber, styrene-ethylene-butylene-styrene rubber and ethylene-acrylate rubber.

11. A composition as specified in claim 10 wherein the curative system is present in an amount which is within the range of about 0.01 phr to about 10 phr.

12. A composition as specified in claim 11 wherein the curative system is elected from the group consisting of sulfur, free radical generators, phenolic resins, quinone derivatives, and maleimide.

13. A composition as specified in claim 12 which is further comprised of a cocuring agent, wherein said cocuring agent is present in an amount which is within the range of about 0.1 phr to about 6 phr.

14. A composition as specified in claim 13 wherein the compatibilizing polymer is present in an amount which is within the range of about 1 phr to about 200 phr.

15. A composition as specified in claim 13 wherein the curative system is present in an amount which is within the range of about 0.01 phr to about 4 phr, wherein the cocuring agent is present in an amount which is within the range of about 0.2 phr to about 4 phr, and wherein the compatibilizing polymer is present in an amount which is within the range of about 10 phr to about 50 phr.

16. A composition as specified in claim 14 wherein the curative system is a phenolic resin.

17. A composition as specified in claim 15 wherein the rubbery polymer is an ethylene-propylene-diene monomer rubber.

18. A composition as specified in claim 14 wherein the curative system is a free radical generator, wherein the free radical generator is present in an amount which is within the range of about 0.2 phr to about 4 phr, wherein the cocuring agent is present in an amount which is within the range of about 0.2 phr to about 4 phr, wherein the polyolefin is present in an amount which is within the range of about 30 phr to about 300 phr, wherein the ethylene-propylene-diene monomer polymer is present in an amount which is within the range of about 30 phr to about 300 phr, and wherein the compatibilizing polymer is present in an amount which is within the range of about 10 phr to about 50 phr.

* * * * *